(12) United States Patent
Bielmeier

(10) Patent No.: US 9,486,952 B2
(45) Date of Patent: **\*Nov. 8, 2016**

(54) APPARATUS AND METHOD FOR EXPANDING PREFORMS INTO CONTAINERS

(71) Applicant: Krones AG, Neutraubling (DE)

(72) Inventor: Heinrich Bielmeier, Pilsting-Großköllnbach (DE)

(73) Assignee: KRONES AG, Neutraubling (DE)

( * ) Notice: Subject to any disclaimer, the term of this patent is extended or adjusted under 35 U.S.C. 154(b) by 262 days.

This patent is subject to a terminal disclaimer.

(21) Appl. No.: 14/060,468

(22) Filed: Oct. 22, 2013

(65) Prior Publication Data

US 2014/0110874 A1   Apr. 24, 2014

(30) Foreign Application Priority Data

Oct. 22, 2012   (DE) .................. 10 2012 110 071

(51) Int. Cl.
| | |
|---|---|
| *B29C 49/78* | (2006.01) |
| *B29C 49/06* | (2006.01) |
| *B29C 49/12* | (2006.01) |

(Continued)

(52) U.S. Cl.
CPC ......... *B29C 49/783* (2013.01); *B29C 49/4236* (2013.01); *B29C 49/06* (2013.01); *B29C 49/12* (2013.01); *B29C 49/42* (2013.01); *B29C 49/4252* (2013.01); *B29C 49/4273* (2013.01); *B29C 49/58* (2013.01); *B29C 49/78* (2013.01); *B29C 2049/4856* (2013.01); *Y02P 70/269* (2015.11); *Y02P 70/271* (2015.11)

(58) Field of Classification Search
None
See application file for complete search history.

(56) References Cited

U.S. PATENT DOCUMENTS

| | | | |
|---|---|---|---|
| 6,709,611 B1 * | 3/2004 | Emmer | B29C 49/783 264/37.16 |
| 9,314,957 B2 * | 4/2016 | Hirdina | B29C 49/58 |

FOREIGN PATENT DOCUMENTS

| | | |
|---|---|---|
| DE | 102009019008 | 10/2010 |
| DE | 10 2011 106 652 A1 | 1/2013 |

(Continued)

OTHER PUBLICATIONS

English Translation of the Abstract for DE 10 2011 106 652, Abstract Translation provided in WO 2013/004657 published Jan. 10, 2013 with priority from DE 10 2011 106 652.

(Continued)

*Primary Examiner* — Monica Huson
(74) *Attorney, Agent, or Firm* — Oppedahl Patent Law Firm LLC

(57) ABSTRACT

The invention relates to an apparatus as well as to a method for expanding preforms into containers within a blow mold by means of a pressurized pneumatic medium, wherein a compressor piston unit for compressing the pneumatic medium is in flow communication with the blow mold, in order to introduce a volume flow of the pneumatic medium into an inner region of the blow mold, and wherein an actuator unit that can be activated by a hydraulic medium interacts with at least one element of the compressor piston unit, in order to drive the compressor piston unit during an expansion process of the container for compressing the pneumatic medium, and in order to be driven itself, during a relaxation process that temporally follows the expansion process, due to the returning volume flow of the pneumatic medium into the compressor piston unit.

12 Claims, 3 Drawing Sheets

(51) Int. Cl.
  *B29C 49/42* (2006.01)
  *B29C 49/58* (2006.01)
  *B29C 49/48* (2006.01)

(56) References Cited

FOREIGN PATENT DOCUMENTS

| WO | 96/25285 A1 | 8/1996 |
| WO | 9625285 | 8/1996 |
| WO | 2013004657 | 1/2013 |

OTHER PUBLICATIONS

Extended European Search Report, dated Feb. 21, 2014, for European Application No. 13189398.4.
Search Report, dated Jun. 5, 1013, for German Application No. 10 2012 110 071.3.

* cited by examiner

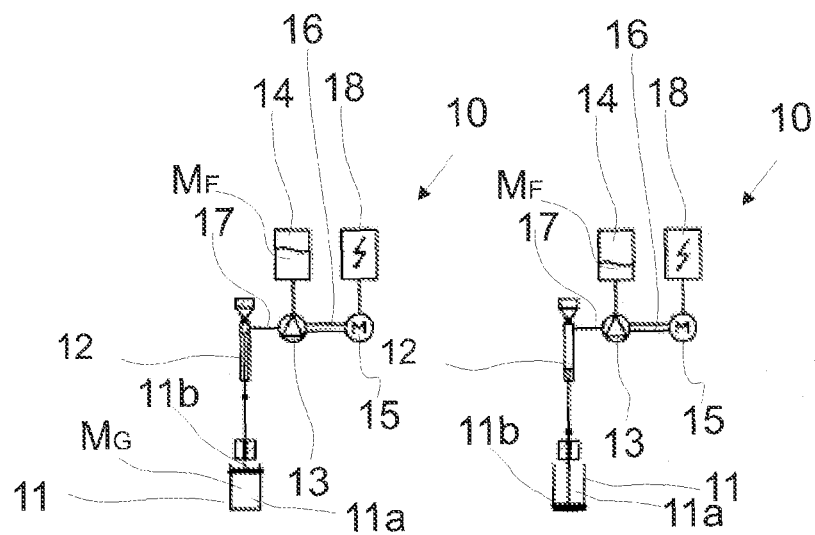
Fig.2a   Fig.2b
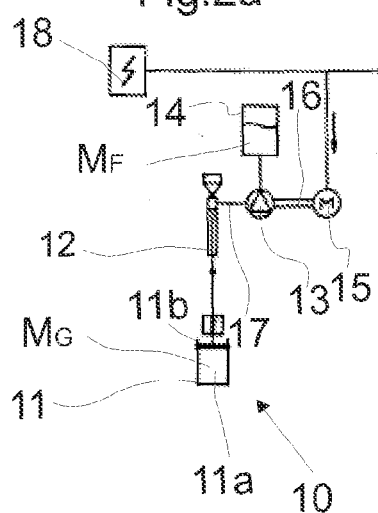 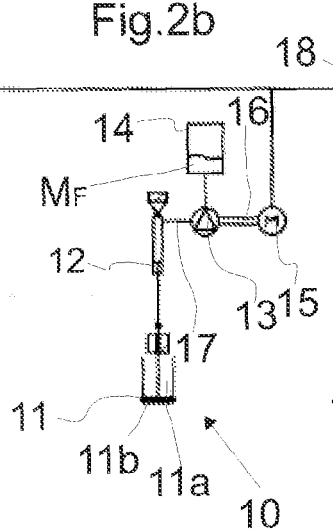
Fig.3

APPARATUS AND METHOD FOR EXPANDING PREFORMS INTO CONTAINERS

BACKGROUND

The present invention relates to an apparatus and a method for expanding preforms into containers within a blow mold by means of a pressurised pneumatic medium.

Apparatuses and methods for expanding containers are applied for example in the industry of manufacturing beverage containers, wherein by means of corresponding treatment systems, inter alia, a preform primarily made from plastic is blown or expanded within a blow mold into a corresponding container that is also made from plastic.

To this end, a corresponding preform is introduced into an inner region of a blow mold that is usually designed in two parts, which blow mold has at least one cavity in the inner region thereof, which is used for shaping the later expanded container. The blow mold principally surrounds the preform over the entire circumference thereof, at least around the bottom area thereof, and the mouth area of the preform, which has a corresponding integral or cut-in internal or external thread, can at least partially protrude out of the blow mold or is not introduced into the blow mold at least in the region of the cavity, so that an expansion and in particular a deformation of the mouth area of the preform during the expansion process thereof is avoided.

The preform is blow molded or stretch blow molded into an expanded container by means of a blow nozzle that can be attached in particular to a mouth area of the preform, through which blow nozzle a pressurised pneumatic or gaseous, flowable medium such as a sterilisation gas or air is introduced into the inner region of the blow mold and thus into the inner region of the container to be expanded or the preform to be expanded.

In one embodiment, a stretch rod is additionally moved from an inlet of the blow mold, which may be located in the region of the mouth area of the preform, up to a bottom area of the blow mold and correspondingly of the continuously expanding container, and to this end the movement is carried out, depending on the positioning or the orientation of the blow mold, substantially along a longitudinal axis of the container and consequently substantially in a vertical or perpendicular direction in relation to the horizontal plane.

However, it is also possible for the blow mold (including the blow nozzle) to move together with the preform correspondingly to be expanded in the direction of the stretch rod and/or the blow nozzle in such a way that as a result of the movement of the blow mold itself, which is carried out in a manner comparable to the movement of the stretch rod substantially in a direction that is normal or perpendicular to the horizontal plane, the stretch rod is accordingly moved through the inner region of the preform to be expanded, so that the introduced pressurised air can be applied substantially uniformly over the inner regions of the preform, as a result of which a deformation of the wall and bottom areas is caused, which is necessary for the expansion of the preform.

However, it is also conceivable that both the stretch rod and/or the blow nozzle as well as the blow mold itself move towards each other and/or away from each other at respectively defined speeds during the expansion process of the preform.

The expansion process of the preform into a container is merely one out of a multiplicity of possible treatment processes of the preform or of the container itself. Accordingly, within an entire system for treating containers, a preform can be treated by way of preheating, heating, disinfecting, drying and/or expanding or blow molding or stretch blow molding, whilst an expanded container can be treated for example using the treatment steps of disinfecting, drying, filling, labelling, sealing with container caps and/or packaging.

The blow molds needed for expansion may be arranged at substantially identical distances from each other on a transport element, such as for example a transport wheel or a star wheel, and are consequently moved by the rotation of the wheel about the central rotation axis thereof also correspondingly at a defined speed about this axis of rotation.

Thus, the preforms are also transported along a specifiable transport path that is orientated in particular perpendicular to the direction of movement of the blow nozzle and/or of the stretch rod and/or of the blow mold.

In one embodiment, the preforms or containers to be expanded are supplied using at least one further transport unit, namely a feed transport unit of the transport unit for the blow molds, and this feed transport unit for the preforms to be expanded is for example a transport belt or a transport wheel. Correspondingly, the expanded containers are taken over from the blow mold transport unit by means of at least one corresponding discharge transport unit and are fed for example to a subsequent treatment station such as for example a disinfection system or a filling system for filling the containers. The containers to be expanded are transferred in the transfer areas between the feed transport unit and the blow mold transport unit or the blow mold transport unit and the discharge transport unit, respectively.

During the expansion process of the preform to be expanded within the blow mold, high blow pressures of for example approximately 35 to 40 bar are used, in particular in order to be able to ensure that the plastic of the preform or the wall of the preform is expanded or deformed in such a way that the latter is inserted or pressed into all of the defined regions of the cavity of the blow mold, so that a container expanded in the manner as defined can be produced. The blow pressure required for this is here dependent, inter alia, on the composition of the plastic, the heating of the preform, the wall thickness of the preform etc.

The generation of the blow air or pressurised air necessary for the expansion of the preform is known to require a lot of energy, in particular also because of the waste heat that is generated in the compressor that compresses the blow air up to a defined pressure. In the case of high-pressure compressors, the waste heat developed is normally discharged to the external environment of the system via a correspondingly provided cooler, in order to avoid for example overheating of the compressor and thus damage to the latter.

SUMMARY OF THE INVENTION

Accordingly, it is desired to provide an apparatus and a method wherein a proportion as large as possible of the energy used for compressing the blow air or the air or the pneumatic medium can be recovered in a relaxation process that follows the expansion process.

The apparatus according to the invention for expanding preforms into containers within a blow mold by means of a pressurised pneumatic medium in particular comprises a compressor piston unit for compressing the pneumatic medium, which is in flow communication with the blow mold, in order to introduce a volume flow of the pneumatic medium into an inner region of the blow mold.

The compressor piston unit which here principally comprises a compression space or a pressure chamber, within which the pneumatic medium is compressed, and at least one piston element for compressing the pneumatic medium within the compression space, is principally in direct or immediate or in indirect communication with the blow mold via corresponding connection lines for directing the pressurised air, in order to press the compressed blow air or the compressed pneumatic medium principally without cooling into the inner region of the blow mold and thus into the inner region of the preform, so that as a result of the direct transition of the compressed pneumatic medium from the compressor piston unit to the blow mold, at least just a minor proportion of heat is output to the environment, as a result of which energy savings can be made even at this early stage by comparison with known blow molding methods.

Thus, the compressor piston unit is provided on the respective blow stations directly or at least indirectly via corresponding connection lines, and a plurality of such compressor piston units may be provided. Respectively one compressor piston unit may be provided for each molding or blow station.

Further, the apparatus according to the invention includes an actuator unit that can be activated by means of a hydraulic medium, which actuator unit interacts with at least one member of the compressor piston unit, in order to drive during an expansion process of the container the compressor piston unit for compressing the pneumatic medium, and in order to be driven itself during a relaxation process, which temporally follows the expansion process, into the compressor piston unit due to the returning volume flow of the pneumatic medium.

In this connection, the actuator unit may also be at least a section or a component of the compressor piston unit and in particular at least a component of the piston element of the compressor piston unit. However, it is also conceivable that the actuator unit and the compressor piston unit constitute two units that are different from each other, which are connected to each other for example mechanically or in a signal transferring manner in such a way that as a result of a movement of the actuator unit, a movement of the compressor piston unit and in particular of the piston element of the compressor piston unit or as a result of a movement of the compressor piston unit and in particular of the piston element of the compressor piston unit, also a movement of the actuator unit is made possible.

The pneumatic medium may be a gaseous medium such as pressurised air or a compressible gas such as a sterilisation gas or the like.

The actuator unit itself principally comprises an actuator piston element and an actuator medium space, within which principally a hydraulic medium is introduced in order to move the actuator piston element. As a result of the movement of the actuator piston element, principally also the piston element of the compressor piston unit, which is in operative connection with this actuator piston element, is moved, so that during an expansion process of the container to be expanded, the piston element of the compressor piston unit compresses a pneumatic medium present in the compression space, which is then principally transferred to a blow nozzle (of a blow mold) or to a blow mold.

However, it is also conceivable for the actuator unit, or at least a component of the actuator unit, to receive an electronic signal for example from a control unit and to translate this into corresponding mechanical movements, in order to control or drive in this way the compressor piston unit.

In one embodiment, at least one storage container containing a hydraulic medium is in communication with the actuator unit via at least one connection line, in order to provide the hydraulic medium to the actuator unit at least intermittently and at least partially.

The hydraulic unit may in this case be a liquid and in particular flowable medium such as water, an aqueous solution or a lubricant such as oil or the like.

It is also conceivable for the apparatus to include a total of two or more storage containers for storing the hydraulic medium and to transfer it to the actuator unit via the connection lines for transporting the hydraulic medium. In this connection, it may be that just one storage container at a time is opened by corresponding valves, in order to be able to provide the hydraulic medium to the actuator unit.

In another embodiment, at least one pump unit is in operative connection with the storage container, in order to effect, at least intermittently, a transport of the hydraulic medium from the storage container to the actuator unit.

In this case, for example at least one drive machine is in operative connection with the pump unit, in order to drive the pump unit and/or in order to be driven or at least relieved by an activated pump unit.

Consequently, the drive machine, which may alternately act as an electric drive motor and as an electric drive generator, may be in operative connection with the pump unit substantially directly via a shaft and/or substantially indirectly via coupling units such as for example meshing gears, which are provided on corresponding shafts of the drive machine and of the pump unit, so that a rotary movement of the rotor of the drive unit effects a rotary movement of the rotor of the pump unit, in order to effect pumping of the hydraulic medium from one of the storage containers through the connection lines in the direction of the actuator unit.

In a further embodiment, a control unit is connected to the drive machine in a signal-transferring manner and/or to at least one valve unit provided between the storage container and the actuator unit, in order to control the drive unit and/or the valve unit at least intermittently in line with demand. This control unit may be a closed-loop control unit, i.e. a closed loop is present.

Accordingly it is conceivable for a valve unit to be activated substantially at the same time as a drive machine, in order to enable a volume flow of hydraulic medium from the at least one storage container in the direction of the actuator unit, provided the drive machine acts as a drive motor and controls the pump unit. Consequently, the valve unit can be closed when neither an expansion process nor a relaxation process is carried out, i.e. in particular if no treatment of a container is carried out. The valve unit is also open during the relaxation process, i.e. once the container has been expanded and the pressurised air pressed into the blow mold escapes therefrom. Here, the pneumatic medium escaping from the blow mold is guided back to the compressor piston unit and in particular into the compression space of the compressor piston unit, wherein the pneumatic medium expands and consequently moves the piston element out of the compression space. In principle, no mechanical force is applied to the piston element, and therefore the latter can be moved from the returning pneumatic medium expanding in the compression space in a substantially unimpeded manner.

As a result of the movement of the piston element, the actuator unit may be activated and in particular the actuator piston element may be moved in such a way that a hydraulic medium present in the actuator medium space is moved out of this space and is transported via the connection lines and the open valve units in the direction of the storage container, from which the hydraulic medium was taken during the expansion process. In this process, the hydraulic medium also flows through the pump unit in such a way that the latter is excited or activated by the volume flow of the returning hydraulic medium, so that consequently also a drive machine in operative connection with the pump unit is driven, which drive machine now acts as a drive generator.

Consequently, a method for expanding preforms into containers within a blow mold by means of a pressurised pneumatic medium is also claimed, according to which during an expansion process for expanding the container, a compressor piston unit for compressing the pneumatic medium is controlled by means of an actuator unit that is driven by a hydraulic medium and cooperates with at least one element of the compressor piston unit, in order to transport the pneumatic medium into an inner region of the blow mold, and wherein during a relaxation process that follows the expansion process, the pneumatic medium is returned into the compressor piston unit, as a result of which the actuator unit is caused to return the hydraulic medium.

In one embodiment, the hydraulic or liquid or flowable medium, which is for example a sterilisation medium, water, an aqueous solution or an oil, is principally fed to a pump unit via at least one connection line, which pump unit is in operative connection with a drive machine, so that as a result of a drive of the pump unit by means of the volume flow of the returning hydraulic medium, also the drive machine in the form of a drive generator is operated.

This means that the pump unit activated by a volume flow of the returning hydraulic medium may accordingly drive the drive machine as a drive generator for generating electric energy and/or delivers the fluid to a pressurised container.

Consequently, the drive machine, which in principal is an electric drive machine that can act both as a drive motor and as a drive generator, may be connected to an electric circuit and in particular to an intermediate electric circuit that may include at least one capacitor or a comparable storage element for storing electric energy. Consequently, the electric energy generated by the drive machine is fed into the electric circuit and in principal into the intermediate circuit of the electric circuit during a relaxation process, as a result of which for example the capacitor can be re-charged. This electric energy fed in will then be available again to the electric drive machine at least partially and at least intermittently during an expansion process for example of a further preform to be expanded, in order to drive or activate the latter in the form of a drive motor again in such a way that the rotor of the drive machine drives the rotor of the pump unit, in order to effect a removal of the hydraulic medium from a storage container as well as the conducting of the hydraulic medium from the storage container to the actuator unit.

In a further embodiment, the individual apparatus according to the invention include a common electric circuit, so that the energy currents, i.e. the flows of the electric energy generated by the drive machine in the form of an electric drive generator, of the apparatus according to the invention, which may be connected next to each other in series, substantially balance each other, and such an arrangement is in principal advantageous for carousels having a plurality of blow stations and accordingly a plurality of apparatus according to the invention, and each blow station may have associated therewith its own apparatus according to the invention.

Consequently, as a result of the apparatus according to the invention, which are arranged in series and are correspondingly also connected to the power network or the electric circuit, electric energy is not just taken from the intermediate circuit of the electric circuit, but is also feed thereto in a substantially continuous manner. In this connection, the container treatment processes and in particular the process of expanding the preform into a container are matched to each other or in relation to each other or are delayed in such a way that while for example a first apparatus according to the invention draws electric energy from the electric circuit, for example in order to commence an expansion process, a second apparatus according to the invention has for example already reached the end of the expansion process or is in particular just at the point of initiating the subsequent relaxation process, so that this second apparatus according to the invention neither has to draw electric energy from the electric circuit nor feeds electric energy into the electric circuit, whilst for example a third apparatus 10 according to the invention is already relatively close to the end of the relaxation process and has completed, substantially simultaneously with the start of the expansion process of the first apparatus, the relaxation process and has therefore completed the process of feeding electric energy into the power network or the electric circuit.

Due to the feed-in of electric energy that was generated by a drive generator that is at least indirectly driven via the returning volume flow of the hydraulic medium, energy is recovered, so that at least a large part of the electric energy required during the expansion process can be fed back into the intermediate circuit.

In a further advantageous embodiment, the apparatus includes electric storage means, in particular for storing electric energy generated by the drive machine. This storage means may for example be a battery or a capacitor. This storage means may be integrated into an intermediate circuit.

In a further embodiment, at least one control unit controls the drive machine and/or at least one valve unit provided between at least one storage container for storing the hydraulic medium and the actuator unit, in order to enable the hydraulic medium to be conducted away from the storage container to the actuator unit during the expansion process and from the actuator unit to the storage unit during the relaxation process.

Consequently, the control unit, which may be connected to the drive machine and/or the valve unit for example in a wireless manner or via corresponding connection lines, is connected to the drive machine and may also be connected to the valve unit in a signal-transferring manner, in such a way that during an expansion process, the drive machine is principally activated by the control as a drive motor whilst the valve unit is open, so that the hydraulic medium can flow from the storage container in the direction of the actuator unit. The valve unit is also normally open during the relaxation process, whilst the drive machine may operate as a drive generator due to the signal transfer between the control unit and the drive machine, so that a volume flow of the returning hydraulic medium can drive the pump unit and therefore also the drive machine that is—for example via a shaft—in operative connection with the pump unit, so that electric energy is generated by the drive machine or the drive generator.

It is pointed out that the present invention is not only applicable to blow molding machines, but can generally be used for any applications in which pressurised air is generated that flows out of a space to which pressurised air is again applied in particular in an intermittent manner (or out of another space).

The invention therefore also generally relates to an apparatus for generating a pressurised pneumatic medium, wherein a compressor piston unit for compressing the pneumatic medium is in flow communication with a space to which the gaseous medium is to be applied, in order to introduce a volume flow of the pneumatic medium into an inner region of the space, and an actuator unit that can be activated by means of a hydraulic medium interacts with at least one member of the compressor piston unit, in order to drive the compressor piston unit so as to compress the pneumatic medium, whilst pressure is being applied onto this space, and in order to be driven itself during a relaxation process that temporally follows the expansion process of the space, by the returning volume flow of the pneumatic medium into the compressor piston unit.

Further advantages, objects and characteristics of the present invention will be explained below by means of the drawings attached to the following description, in which drawings, inter alia, embodiments of the apparatus according to the invention and the functioning mode thereof will be illustrated by way of examples.

The present application claims priority from German patent application number 10 2012 110 071.3 filed Oct. 22, 2012, incorporated herein by reference for all purposes.

DESCRIPTION OF THE DRAWING

In the figures:

FIG. 2a shows a schematic diagram of a first embodiment of the apparatus according to the invention at the beginning of a first operating condition;

FIG. 2b shows a schematic diagram of the embodiment shown in FIG. 2a of the apparatus according to the invention at the end of the first operating condition;

FIG. 3 shows a schematic diagram of an arrangement of several first embodiments of the apparatus according to the invention as shown in FIG. 2a and FIG. 2b.

Components which at least substantially coincide in the figures in terms of their function may here be identified with the same reference signs, but such components do not have to be identified and explained in all the figures.

DETAILED DESCRIPTION

Figure 1:
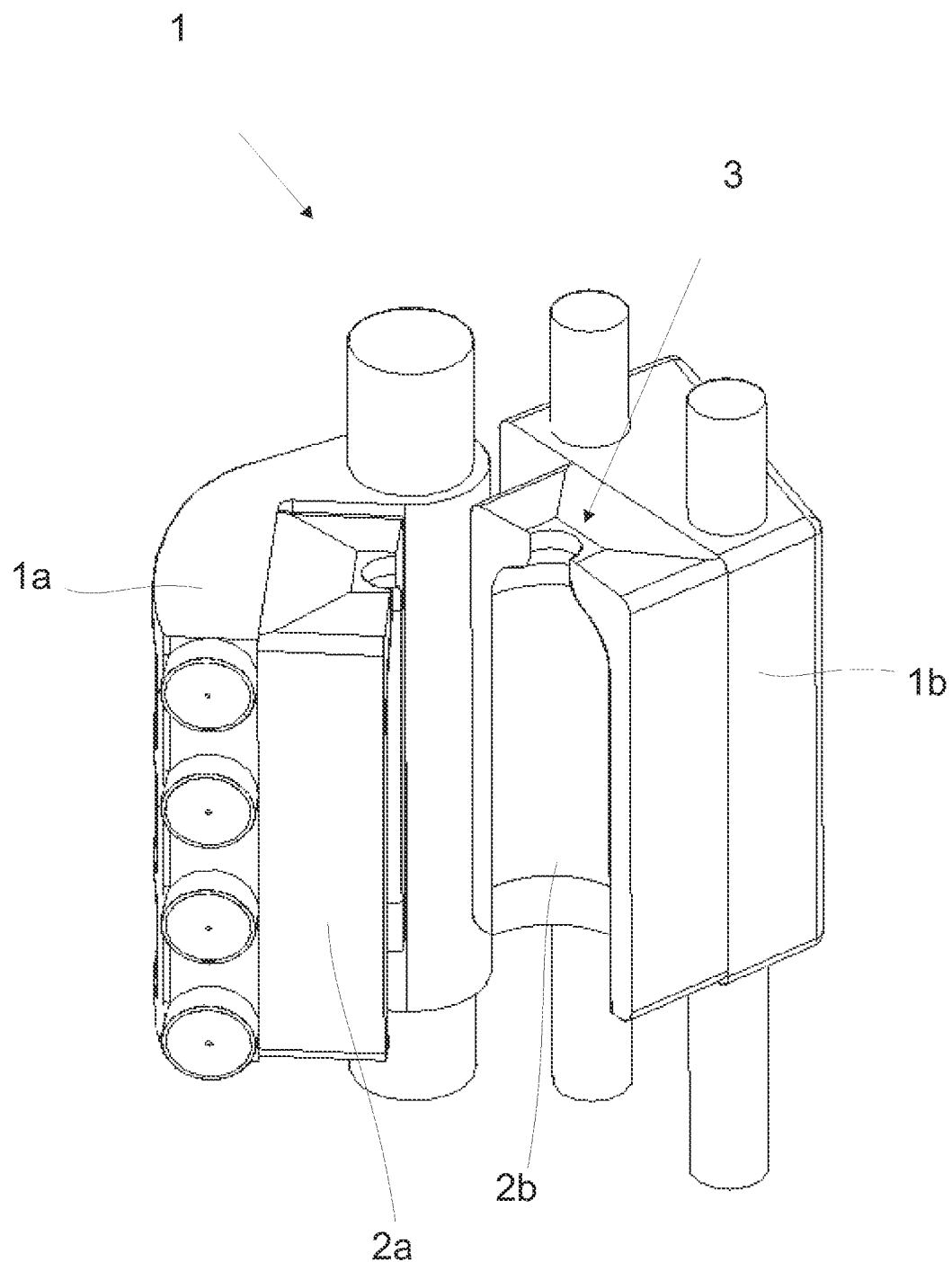
FIG. 1 shows a schematic diagram of an embodiment of a blow mold for expanding preforms into containers.

FIG. 1 shows a schematic diagram of an embodiment of a blow mold 1 for expanding preforms (not shown here) into containers (not shown here). To this end, the blow mold 1 comprises for example two blow mold halves 1a, 1b, which in turn each have a cavity 2a and 2b, respectively, within which the container to be expanded or the preform is accommodated at least intermittently and at least partially. At least during the expansion process, the two blow mold halves 1a and 1b may be closed together in such a way that pressurised air can be pressed only over an upper area 3 of the blow mold 1, which surrounds the mouth area of the preform (not shown here), into the inside of the blow mold 1 and in particular into the preform introduced into the cavities 2a, 2b.

FIG. 2a shows a schematic diagram of a first embodiment of the apparatus 10 according to the invention at the beginning of the first operating condition and in particular a position of the compressor piston unit 11 in an initial or starting position of the expansion process of the container or of a compressing process for compressing the pneumatic medium. It is assumed that a preform (not shown here) is supposed to be expanded. Also, FIG. 2a does not show a blow mold for expanding the containers, in particular for clarity reasons.

An electric circuit 18 connected to the drive machine 15, which circuit may in particular also include an intermediate circuit with a capacitor provided therein (not shown here), provides the drive machine 15 with electric energy, which may be a drive machine 15 that can be driven with electric energy, in order to drive or operate this drive machine 15 in the form of a drive motor and in particular an electric drive motor.

The pump unit 13 that is operatively connected to the drive machine 15 and is in particular connected to the drive machine 15 via a shaft 16, is driven by the drive machine 15 and in principal by the rotor rotation of the drive machine 15 in such a way that a hydraulic or liquid medium $M_F$, which is present in at least one storage container 14, is transported from the storage container 14 in the direction of a connection line 17 for transporting the hydraulic medium $M_F$ and from there in the direction of an actuator unit 12.

The actuator unit 12 driven by the volume flow of the hydraulic medium $M_F$ is in turn in operative connection with a compressor piston unit 11 that includes a compression space 11a as well as a piston element 11b, which piston element 11b at least partially protrudes into the compression space 11a and can be moved therein.

As a result of the principally mechanical movement of at least one element or one component of the actuator unit 12, in particular the piston element 11b is moved in the direction of the bottom of the compression space 11a, so that the pneumatic or gaseous medium $M_G$ present within the compression space 11a is compressed and escapes or is guided in the direction a blow mold (not shown here), in order to effect an expansion or a blowing up or deformation of the preform into a container.

FIG. 2b shows a schematic diagram of the embodiment already shown in FIG. 2a of the apparatus 10 according to the invention, however now at the end of the first operating condition and thus during or temporally just before the beginning of a second operating condition, where in particular the end position of the compressor piston unit 11 is shown after the expansion process of the container or after the compression process of the pneumatic medium. This means that the expansion or the blowing up of the preform into a container and consequently the expansion process is followed by a relaxation process in which the pneumatic medium used for expanding the container is not, as known from the general prior art, output into the external environment, but is returned from the blow mold (not shown here) into the compression space 11a of the compressor piston unit 11. This means that the compression space 11a is filled again with the pneumatic medium in such a way that the piston element 11b which is now principally located at the bottom end and thus in the bottom area of the compression space 11a, is pressed back up, i.e. along the compression space 11a in what may be a vertical direction, so that as a result of the movement of the piston element 11b, also a movement of the actuator unit 12 is initiated.

The piston element 11b and at least a component or module of the actuator unit 12 may be coupled together in such a way that as a result of a movement of the piston element 11b, also the element or the component of the actuator unit 12 and principally an actuator piston element (not shown here) is moved in such a way that the hydraulic medium $M_F$, which is located for example in an actuator medium space (not shown here), is pressed by the movement of the actuator piston element out of the actuator medium space into the adjacent connection lines 17 connected to the actuator medium space for transporting the hydraulic medium $M_F$.

The returning volume flow of the hydraulic medium $M_F$ will then flow along the connection line 17 to the pump unit 13, which is consequently set in motion by the volume flow and consequently may operate as a fluid motor. Subsequently, also the drive machine 15, which may be coupled to the pump unit 13, is also driven for example by the rotary movement of the pump unit 13 or of the fluid motor and consequently acts as an electric drive generator, which outputs corresponding electric power to the adjacent electric circuit 18 and in particular to an intermediate circuit located therein with a corresponding capacitor.

Instead of the capacitor, however, for example a rechargeable battery may also be provided, which is re-charged with the electric energy correspondingly generated by the drive generator.

FIG. 3 shows a schematic diagram of an arrangement of several of the first embodiments of the apparatus 10 according to the invention as shown in FIG. 2a and FIG. 2b, wherein the individual apparatus are arranged next to each other and include a common electric circuit 18. Apart from that, the design of the individual apparatus substantially corresponds to the design of the apparatus 10 as shown in FIGS. 2a and 2b.

In one embodiment, each apparatus 10 has associated therewith its own blow mold (not shown here), so that each blow mold can start a blow process for expanding the container to be expanded independently from another blow mold that is also located on the same transport unit.

FIG. 3 illustrates that the energy currents, i.e. the flow of electric energy generated by the drive machine 15 in the form of an electric drive generator of the apparatus 10 arranged in series next to each other, substantially balance each other, and such an arrangement as shown in FIG. 3 is principally advantageous for carousels having a plurality of blow stations.

Consequently, in the apparatus 10 that are arranged in series and are correspondingly also connected to the power network 18 or the electric circuit 18, electric energy is not just taken from the intermediate circuit of the electric circuit 18, but is also fed thereto. In this context, the container treatment processes and in particular the process for expanding the preform into a container, are matched to each other or in relation to each other or are delayed in such a way that whilst for example a first apparatus 10 (the left-hand apparatus in FIG. 3) draws electric energy from the electric circuit 18 in order to start an expansion process, a second apparatus 10 (the central apparatus in FIG. 3) is already at the end of the expansion process itself and is in particular about to initiate the subsequent relaxation process, so that this second apparatus neither has to draw electric energy from the electric circuit 18, nor feeds electric energy into the electric circuit 18, whilst a third apparatus 10 (the right-hand apparatus in FIG. 3) is already relatively close to the end of the relaxation process and has completed the relaxation process and thus a feeding process of electric energy into the electric network 18 or the electric current 18 substantially at the same time as the expansion process of the first apparatus begins.

Consequently, advantageously an amount of energy is fed to the electric current 18 that is substantially comparable to that which is taken from it.

Figure 4:
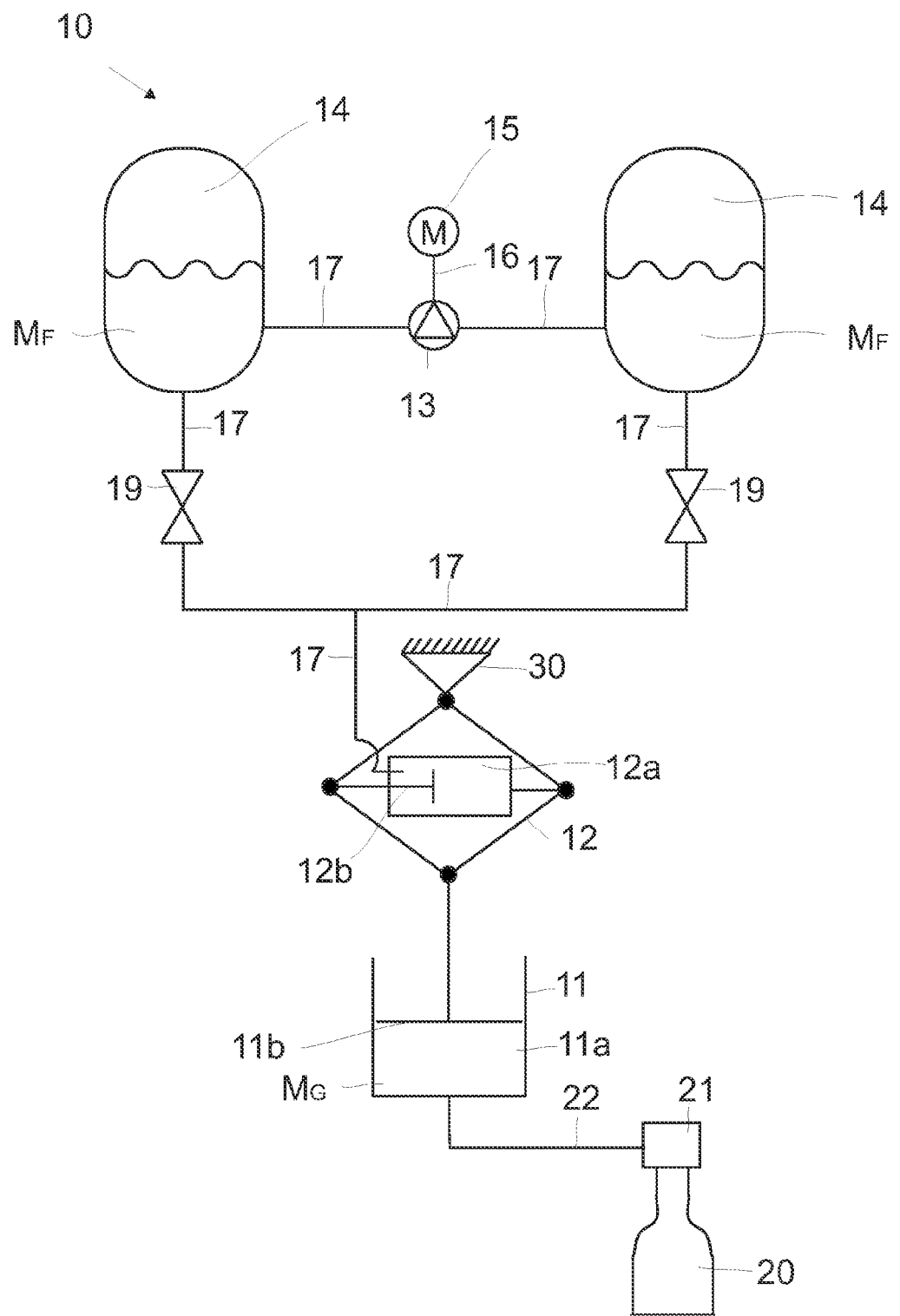
FIG. 4 shows a schematic diagram of a second embodiment of the apparatus according to the invention.

The schematic diagram shown in FIG. 4 illustrates a second embodiment of the apparatus 10 according to the invention, wherein in a manner comparable to that of FIGS. 2a to 3, also the apparatus 10 of FIG. 4 comprises an actuator unit 12 as well as a compressor piston unit 11 in operative connection therewith. Moreover, two storage containers 14 containing hydraulic medium $M_F$ are shown, which two storage containers 14 are in fluid communication with at least one pump unit 13 via corresponding connection lines 17. The pump unit 13 in turn is mechanically connected to a drive machine 15, which operates either as a drive motor or as a drive generator, at least intermittently and at least partially, for example via a shaft 16. The pump 13 can be used to establish a pressure differential between the two storage containers 14.

Further, FIG. 4 shows two valve units 19 which are provided between the respective storage containers 14 and the actuator unit 12 on a corresponding connection line 17.

According to FIG. 4, the actuator unit 12 includes an actuator medium space 12a for receiving a hydraulic or liquid and flowable medium $M_F$, as well as an actuator piston element 12b which is in principal moved by the hydraulic medium $M_F$ introduced into the actuator medium space 12a within at least defined limits of movement.

The actuator unit 12 may be supported by means of at least one corresponding bearing unit 30 within the apparatus 10 and may be at a distance from the compressor piston unit 11 and the storage containers 14 as well as from the drive machine 15, the pump unit 13 and the valve units 19.

However, it is also conceivable for the actuator unit 12 or in particular the actuator piston element 12b to be a component of the compressor piston unit 11 and in particular the piston element 11b, so that as a result of the displacement or the movement of the actuator piston element 12b, also a movement of the piston element 11b of the compressor piston unit 11 and the other way round is directly carried out, without any connection elements or signal transferring lines having to be provided or connected between the individual elements 11b, 12b.

Further, a blow nozzle 21 is shown which may be attached at least partially to the mouth area of the container to be expanded in such a way that on the one hand any escape of the pneumatic or gaseous medium $M_G$ during the expansion process, but also during the relaxation process is avoided, and on the other hand the pneumatic medium $M_G$ can be introduced into the inner region of the blow mold (not shown here) and thus into the inner region of the container 20 to be expanded. A further connection line 22 extends, at least in sections, into this blow nozzle for transporting the pneumatic medium $M_G$, which establishes a connection between the compressor piston unit 11 and the container 20 to be expanded, which may be provided within a blow mold (not shown here), so that the compressed pneumatic medium $M_G$ can be transferred from the compression space 11a of the compressor piston unit 11 of the blow mold and thus to the preform or the container 20.

The procedure in respect of the expansion process or the relaxation process is substantially identical to the illustrations explained above in FIGS. 2a to 3. Accordingly, the drive machine 15 is activated during an expansion process, and in particular for example the rotor (not shown here) thereof is set into rotation, so that the pump unit 13 coupled to the drive machine 15 is also activated and a hydraulic medium stored in the storage containers 14 is transported to the actuator unit 12 in particular into the actuator medium space 12a along connection lines 17 through valve units 19. However, it is pointed out that in the embodiment shown in FIG. 4, the drive machine can also operate or run independently from the expansion process.

In the embodiment shown in FIG. 4, the expansion process can be initiated by opening a valve 19 and in particular the valve 19 that opens the storage container with the higher pressure level. The other valve 19 may remain closed.

As a result, the hydraulic medium $M_F$, which propagates in the actuator medium space 12a and substantially continuously fills the space 12a, consequently displaces the actuator piston element 12b within the actuator medium space 12a, as a result of which a piston element 11b of the compressor piston unit 11, which may be connected to the actuator piston element 12b or is in operative connection therewith, is moved substantially at the same time as the actuator piston element 12b and moves into a compression space 11a in such a way that the pneumatic or gaseous medium $M_G$ present therein is compressed and leaves the compression space 11a along at least one connection line 22 in the direction of the container 20 to be expanded in a compressed or pressurised condition, in order to blow up or expand the latter.

The expansion process, i.e. when the container has substantially completely been expanded or blown up, is followed by the relaxation process, during which the pneumatic medium $M_G$ present in the container 20 is moved back out of the container 20, via the connection line 22 in the direction of the compressor piston unit 11. This is made possible for example due to the fact that the drive machine 15 no longer drives the pump unit 13 due to a deactivation of the drive machine 15, so that no further hydraulic medium $M_F$ is introduced into the actuator unit 12 from at least one of the two storage containers 14 shown, as a result of which a defined pressure is applied onto the piston element 11b. However, it is also possible that the drive machine may continue to run. The above effect may be achieved here due to the fact that the valve 19 which is connected to the storage container having a high pressure level is closed. Subsequently, the valve 19 that is connected to the pressure container with a low pressure level is opened.

Consequently, the piston element 11b is now pressed back out of the compression chamber 11b, due to the pressure of the pneumatic medium $M_G$ flowing out of the container 20, so that the combustion chamber 11a can be filled again with pneumatic medium $M_G$. As a result of the backward movement of the piston element 11b, also the actuator piston element 12b moved by the medium $M_F$ flowing in the actuator medium space 12a is moved again in the opposite direction, so that consequently the hydraulic medium $M_F$ present in the actuator medium space 12a is transported back, via at least one of the connection lines 17, through at least one of the valve units 19 into at least one of the storage containers 14. It would thus be conceivable that as a result of the volume flow of the returning hydraulic medium $M_F$, also the pump unit 13 in the form of a fluid motor is operated, as a result of which the drive machine 15 in the form of a drive generator, which is coupled to the pump unit 13, is driven and generates electric energy that can be fed into a corresponding intermediate circuit (not shown here) of a provided electric circuit (not shown here). However, it would also be conceivable for the pump unit 13 to pump the fluid from a low pressure level in one container to a high pressure level in the other container.

As a result of the feed-in of electric energy, energy is recovered, so that a cost-effective operation of a container treatment apparatus, such as a blow molding apparatus for blow molding or stretch blow molding or expanding a preform into a container is made possible.

As a result of the direct mounting of the compression unit on the blow mold, adiabatic compression can be realised. This is much more effective than a decentralised compressor unit or an isothermal compression. In the embodiment shown in FIGS. 2 and 3, energy is fed back into an intermediate circuit, in the embodiment shown in FIG. 4, into a fluid container onto which pressure is applied. A combination of those two methods is also conceivable.

The applicant reserves the right to claim all of the features disclosed in the application document as being essential to the invention, in as far as they are novel over the prior art either individually or in combination.

LIST OF REFERENCE NUMBERS

1 Blow mold
1a, 1b Blow mold half
2a, 2b Cavity
3 Upper area
10 Apparatus
11 Compressor piston unit
11a Compression space
11b Piston element
12 Actuator unit
12a Actuator medium space
12b Actuator piston element
13 Pump unit
14 Storage container
15 Drive machine
16 Shaft
17 Connection line for hydraulic medium
18 Electric circuit with intermediate circuit and capacitor
19 Valve unit
20 Container
21 Blow nozzle
22 Connection line for pneumatic medium
$M_F$ Hydraulic medium/liquid medium
$M_G$ Pneumatic medium/gaseous medium

The invention claimed is:

1. Method for expanding preforms into containers (20) within a blow mould (1) by means of a pressurised pneumatic medium ($M_G$),
wherein
during an expansion process for expanding the container (20), a compressor piston unit (11) for compressing the pneumatic medium ($M_G$) is controlled by means of an actuator unit (12) that is driven by a hydraulic medium ($M_F$) and interacts with at least one element of the compressor piston unit (11), in order to transport the pneumatic medium ($M_G$) into an inner region of the blow mould (1), and that
during a relaxation process that follows the expansion process, the pneumatic medium ($M_G$) is returned into the compressor piston unit (11), as a result of which the actuator unit (12) is caused to a return of the hydraulic medium ($M_G$); and
wherein
a piston element (11b) and at least a component or module of the actuator unit (12) are coupled together in such a way that as a result of a movement of the piston element (11b) the module or the component of the actuator unit (12) is moved.

2. The method as claimed in claim 1, wherein during the relaxation process, the hydraulic medium ($M_F$) is fed to a pump unit (13) via at least one connection line (17), wherein the pump unit (13) is in operative connection with a drive machine (15).

3. The method as claimed in claim 2, wherein the pump unit (13) activated by a volume flow of the hydraulic medium ($M_F$) therethrough drives the drive machine (15) as a drive generator for generating electric energy and/or delivers the fluid into a pressurised container.

4. The method as claimed in claim 2, wherein a control unit controls the drive machine (15) and/or at least one valve unit (19) provided between at least one storage container (14) for storing the hydraulic medium ($M_F$) and the actuator unit (12), in order to allow, during the expansion process, the hydraulic medium ($M_F$) to be discharged from the storage container (14) to the actuator unit (12), and during the relaxation process, from the actuator unit (12) to the storage container (14).

5. Method for expanding preforms into containers (20) within a blow mould (1) by means of a pressurised pneumatic medium ($M_G$),
wherein
during an expansion process for expanding the container (20), a compressor piston unit (11) for compressing the pneumatic medium ($M_G$) is controlled by means of an actuator unit (12) that is driven by a hydraulic medium ($M_F$) and interacts with at least one element of the compressor piston unit (11), in order to transport the pneumatic medium ($M_G$) into an inner region of the blow mould (1), and that
during a relaxation process that follows the expansion process, the pneumatic medium ($M_G$) is returned into the compressor piston unit (11), as a result of which the actuator unit (12) is caused to a return of the hydraulic medium ($M_G$)
and wherein the actuator unit (12) itself comprises an actuator piston element (12b) and an actuator medium space (12a) within a hydraulic medium ($M_F$) is introduced in order to move the actuator piston element (12b) in such a way that the movement of the actuator piston element (12b) also moves the piston element (11b) of the compressor piston unit (11) which is in operative connection with the actuator piston element (12b) so that during an expansion process of the container to be expanded the piston element (11b) of the compressor piston unit (11) compresses a pneumatic medium ($M_G$) present in the compression space (11a) which is then transferred to a blow nozzle or to a blow mold (1).

6. The method according to claim 1, wherein as a result of the movement of the actuator piston element (12b) also the piston element (11b) of the compressor piston unit (11) which is in operative connection with the actuator piston element (12b) is moved.

7. The method according to claim 1 wherein the actuator unit (12), or at least a component of the actuator unit (12), receives an electronic signal from a control unit and translates this signal into corresponding mechanical movements.

8. The method according to claim 2 wherein the drive machine (15) alternately acts as an electric drive motor and as an electric drive generator.

9. The method according to claim 1, wherein the movement of the piston element (11b) initiates a movement of the actuator unit (12).

10. The method according to claim 1, wherein the hydraulic medium ($M_F$) which is located in an actuator medium space (12a) is pressed by the movement of the actuator piston element (12b) out of the actuator medium space (12a) into adjacent connection lines (17) connected to the actuator medium space (12a) for transporting the hydraulic medium ($M_F$).

11. The method according to claim 4, wherein two storage containers (14) are provided which contain the hydraulic medium ($M_F$) and which are in fluid communication with the at least one pump unit (13) via connection lines (17).

12. The method according to claim 11, wherein the pump unit (13) establishes a pressure differential between the two storage containers (14).

* * * * *